United States Patent
Benner et al.

(10) Patent No.: US 8,644,327 B2
(45) Date of Patent: *Feb. 4, 2014

(54) SWITCHING ARRANGEMENT AND METHOD WITH SEPARATED OUTPUT BUFFERS

(75) Inventors: Alan Benner, Poughkeepsie, NY (US); Antonius Engberson, Feusisberg (CH); Gottfried Goldrian, Boeblingen (DE); Ronald Luijten, Horgen (CH)

(73) Assignee: International Business Machines Corporation, Armonk, NY (US)

( * ) Notice: Subject to any disclaimer, the term of this patent is extended or adjusted under 35 U.S.C. 154(b) by 487 days.

This patent is subject to a terminal disclaimer.

(21) Appl. No.: 12/947,887

(22) Filed: Nov. 17, 2010

(65) Prior Publication Data

US 2011/0149729 A1 Jun. 23, 2011

Related U.S. Application Data

(63) Continuation of application No. 10/469,476, filed on May 18, 2004, now Pat. No. 7,848,341.

(30) Foreign Application Priority Data

Feb. 28, 2001 (EP) .................................... 01104850

(51) Int. Cl.
*H04L 12/28* (2006.01)
*H04L 12/56* (2011.01)

(52) U.S. Cl.
USPC .......................................... 370/412; 370/429

(58) Field of Classification Search
None
See application file for complete search history.

(56) References Cited

U.S. PATENT DOCUMENTS 5,224,093 A * 6/1993 Denzel et al. ................. 370/417
5,455,820 A * 10/1995 Yamada .................... 370/395.71
5,546,391 A * 8/1996 Hochschild et al. .......... 370/413
(Continued)

FOREIGN PATENT DOCUMENTS

DE 19617816 A1 9/1990
JP 0746252 2/1995
(Continued)

OTHER PUBLICATIONS

Ahmadi, et al, "A High-Performance Switch Fabric for Integrated Circuit and Packet Switching", IEEE Infocom '88, Mar. 1988, pp. 9-18.

*Primary Examiner* — Suk Jin Kang
(74) *Attorney, Agent, or Firm* — William Stock; Anne Vachon Dougherty

(57) ABSTRACT

A switching device is able to route the arriving data packets according to data packet destination information to dedicated output ports. The switching arrangement has, for each set of input ports in the switching device, a set of output buffers with an output buffer for storing the payload of each data packet at an address in the output buffer which pertains to the same set of output buffers and belongs to the dedicated output ports. At least one of the output buffers has a set of output queues with an output queue for each output port for storing the address of each payload stored in the corresponding output buffer. An arbiter controls a readout order of the stored addresses. For the output buffers which pertain to the same set of output ports a multiplexer multiplexes according to the readout order the payloads from the output buffers to the output ports.

18 Claims, 4 Drawing Sheets

(56) References Cited

U.S. PATENT DOCUMENTS

| | | | |
|---|---|---|---|
| 5,787,086 A * | 7/1998 | McClure et al. | 370/413 |
| 5,838,677 A * | 11/1998 | Kozaki et al. | 370/389 |
| 5,838,922 A * | 11/1998 | Galand et al. | 709/232 |
| 5,872,769 A * | 2/1999 | Caldara et al. | 370/230 |
| 6,009,078 A * | 12/1999 | Sato | 370/232 |
| 6,046,997 A * | 4/2000 | Fan | 370/395.71 |
| 6,067,298 A * | 5/2000 | Shinohara | 370/395.71 |
| 6,473,432 B1 * | 10/2002 | Nishimura et al. | 370/412 |
| 6,606,317 B1 * | 8/2003 | Beadle et al. | 370/390 |
| 6,944,170 B2 * | 9/2005 | Minkenberg | 370/411 |
| 7,085,269 B2 * | 8/2006 | Sano | 370/390 |
| 7,145,873 B2 * | 12/2006 | Luijten et al. | 370/230 |

FOREIGN PATENT DOCUMENTS

| | | |
|---|---|---|
| JP | 07079252 | 3/1995 |
| JP | 08214008 | 8/1996 |
| JP | 09162879 | 6/1997 |
| JP | 10126419 | 5/1998 |
| JP | 10065678 | 6/1998 |
| JP | 11215140 | 6/1999 |

* cited by examiner

SWITCHING ARRANGEMENT AND METHOD WITH SEPARATED OUTPUT BUFFERS

CROSS-REFERENCE TO RELATED APPLICATIONS

This application claims the benefit of European Patent Application number 01104850.1 filed on Feb. 28, 2001 and is a continuation application of U.S. patent application Ser. No. 10/469,476 filed May 18, 2004.

FIELD OF THE INVENTION

The invention relates to a switching arrangement for packets of data, with several input ports and several output ports and which is determined for the transportation of incoming packets to one or more designated of the output ports and from there to a subsequent device. More particularly it relates to a switching arrangement and method wherein for each input port a set of output buffers is arranged, each set comprising an output buffer for each output port. As data packets, particularly ATM cells or also Ethernet frames can be accepted.

BACKGROUND OF THE INVENTION

Fast switching of information, be it samples of analog signals or alphanumeric data, is an important task in a communication network. The network nodes in which lines or transmission links from various directions are interconnected for exchanging information between them are often the cause of delay in the transmission. If much traffic is concentrated in a node, and if in particular most of the traffic passes through only few of the links, increased delays or even loss of information are often encountered. It is therefore desirable to have switching nodes which allow fast routing.

In EP 312628 is described a switching apparatus for interconnecting a plurality of incoming and outgoing transmission links of a communication network, or for exchanging data between incoming and outgoing computer- and workstation connection links. Furthermore, known packet formats are described.

An overview over prior art switching technology is given on the Internet page www.zurich.ibm.com/Technology/ATM/SWOCPWP, wherein an introduction into the PRIZMA Chip is illustrated. Another source for information about this topic is the publication "A flexible shared-buffer switch for ATM at Gbit/s rates" by W. E. Denzel, A. P. J. Engbersen, I. Iliadis in Computer Networks and ISDN Systems, (0169-7552/94), Elsevier Science B.V., Vol. 27, No. 4, pp. 611-624.

The PRIZMA chip comprises a shared common output buffer has 16 input ports and 16 output ports which provide a port speed of 300-400 Mbit/s. The switch's principle is first to route incoming packets through a fully parallel I/O routing tree and then to queue the routed packets in the output buffer. In addition to this, the chip uses a separation between data (payload) and control (header) flow. Only the payloads are stored in a dynamically shared output buffering storage. With this architecture, head-of-the-line-queuing is avoided. The PRIZMA chip has a scalable architecture and hence offers multiple expansion capabilities with which the port speed, the number of ports and the data throughput can be increased. These expansions can be realized based on a modular use of the PRIZMA. Also single-stage or multi-stage switch fabrics can be constructed in a modular way.

The PRIZMA chip is especially suited for broadband telecommunications, based on ATM, i.e. the Asynchronous Transfer Mode. However, the concept is not restricted to ATM-oriented architectural environments. ATM is based on short, fixed-length packets, often called cells and is supposed to be applied as the integrated switching and transmission standard for the future public Broadband Integrated Services Digital Network (BISDN). PRIZMA's topology and queuing arrangement for contention resolution employs a high degree of parallelism. The routing function is performed in a distributed way at the hardware level, referred to as self-routing. ATM packets are classified into several packet types, particularly packet types with different payload sizes, and the PRIZMA chip is dedicated to handle packets with a payload up to 64 bytes. However, also packet payloads with 12, 16, 32 or 48 bytes are often to be transported.

The bandwidth through the shared memory of an output-queued switch must equal N times the individual port speed, which poses significant implementation concerns at high line rates. Because of this, input-queued switches have gained popularity in recent years. The performance limitations of FIFO-queued crossbar-based switches have been largely overcome by applying techniques such as virtual output queuing (VOQ), combined with centralized scheduling to achieve good throughput. VOQ entails the sorting of incoming packets at the input side based on the packet's destination output.

Packet switches that rely solely on output queuing are not well scalable to high data rates because of the high memory bandwidth requirement. Implementations that use a high degree of parallelism can achieve the desired bandwidth, but limit the amount of memory that can be integrated on a single chip, thus potentially leading to high packet loss rates and highly traffic-dependent performance.

SUMMARY OF THE INVENTION

It is an advantage of the invention according to the claims that the switching arrangement is less expensive than other switching arrangement with comparable performance because the output router function is substituted by a multiplication of output buffer space which is much cheaper than the space needed for an output router. Output routers need an extraordinary amount of wiring which is not necessary for memory. Furthermore the logic circuitry for processing the data packets becomes less complex which facilitates circuit design.

A switch input queue can be arranged for queuing therein the data packets arriving at the input port. Such a queue has the advantage that it can buffer the data packets whereby for each data packet only one copy is stored instead of multiple copies in the output buffers.

An address manager can be arranged for managing the use of the addresses of the output buffer, and an output queue router can be used for entering the addresses at which the data packets are stored in the output buffer, into the output queues.

A bypass for leading the payload directly from the input port to its multiplexer has the advantage that the data packets can be processed without using the output buffers, an address and the output queues. This saves time, reduces system usage and the risk of backpressure.

A congestion detector can be used for allowing the data packet to be led via the corresponding bypass when the corresponding multiplexer is able to multiplex the data packet to its output port. This provides a simple solution for deciding whether a data packet can be transferred directly to the output port.

The output queues can provide in total more queuing places for the addresses than the corresponding output buffer has addresses. When the output queues have more queuing places than the output buffer has addresses, a non-equal distribution between the various input queues can be handled without losing data packets. A total unequal distribution could be buffered completely if each output queue has the number of queuing places equal to the number of addresses in the corresponding output buffer.

An input buffer with at least as many input queues as the switching arrangement has output ports, whereby the input queues serve for sorting the arriving data packets according to their dedicated at least one output port reduces the risk of head-of-the-line blocking An input controller for each input port, serving for controlling the order of multiplexing the data packets from the input queues to the switching device, is advantageous since it provides autonomous control for the corresponding input queues, which reduces the control complexity for the input queuing mechanism.

An output-queue threshold comparator can be used for signaling to the input buffers if a threshold value of occupied places in the total of all output queues pertaining to one common output port is exceeded. Such a common threshold comparator uniting the filling degrees of all output queues pertaining to one and the same output port is advantageous because, thereby the true traffic heading for this one output port is measured and used to create a feedback onto the input queues that leads to an effective traffic control in case of congestion.

Upon a signal from the output-queue threshold comparator that the threshold value of occupied places in the total of all output queues pertaining to the same output port is exceeded, only the input queue which corresponds to the same output port should be prevented from delivering its data packets to the same output port. Distributing thereby the feedback from the threshold comparator to the input queues in a selective way, namely only to those input queues that hold data packets for the corresponding output port where the congestion has occurred, brings the advantage that not an unnecessary blocking effect is introduced by backpressure.

Thereby the head-of-the-line blocking effect is reduced also in case of congestion.

An output buffer backpressure generator can be provided for signaling to the input buffer corresponding to the output buffer that a threshold value of occupied addresses in the output buffer is exceeded. Such output buffer backpressure generation is practical in that the risk of loss of data packets due to the output buffer being full is reduced.

For a multicast data packet the address thereof can be entered in each of the output queues for the output ports which this multicast data packet is intended to reach and the address is then only released by the address manager for use for another data packet, when all entries of the multicast data packet have been used for delivering the multicast data packet to its designated output ports. Multicast data packets can be hence handled by storing the payload only once in the output buffer and entering the address thereof in the output queue of every output port, this data packet is heading for. A counter can be used that is decremented each time the address is read out from the output queue and which when reaching zero, enables the release of the address for further use.

For data packets with different handling-priorities, for each class of priority and for each output port a separate input queue can be provided in the input buffer. Different input queues for handling different priorities allow data packets with higher priority to pass by those with lower priority.

A demultiplexer can be used for making for each of the arriving data packets an entry into those of the input queues, which are identified in the packet destination information of the corresponding data packet, whereby each input controller is designed to allow simultaneous transmission of those data packets whose entries are located in different of the input queues and who have identical payload. This provides a way of handling multiplex data packets by putting copies for each dedicated output port into the corresponding input queue and multiplexing those copies at the same time, if the output port status allows this. Each entry may comprise at least the payload of the corresponding data packet or a pointer to a memory cell wherein at least the payload of the corresponding data packet is stored, the memory cell preferably being located in a common input buffer. Hence also in the input buffer, a system is feasible that only queues the headers and stores the payloads in a separate memory section, also referred to as common input buffer. In such a case, the payload of a multicast data packet needs only be stored once which saves memory space.

The demultiplexer can be designed to make several entries in the input queues and only one entry of the payload thereof in a memory cell.

The invention proposes a switching arrangement for transporting data packets from input ports of a switching device to output ports thereof. The data packets comprise a payload. There is also associated data packet destination information. The switching device is able to route the arriving data packets according to the data packet destination information to at least one dedicated of the output ports.

The switching arrangement comprises for each set of input ports in the switching device a set of output buffers. Such a set of input ports may comprise one or several input ports. This set of output buffers comprises for each set of output ports an output buffer for storing at least the payload of each data packet arriving at the corresponding input port, belonging to the set of input ports, at an address in at least those of the output buffers which pertain to the same set of output buffers, and which belong to the dedicated output ports. A set of output ports may comprise one or several output ports. For at least one of the output buffers a set of output queues is arranged which comprises for each output port an output queue, for storing therein, sorted according to the data packet destination information, the address of each payload stored in the corresponding output buffer. For the output queues which pertain to the same output port an arbiter controls a readout order of the stored addresses. For the output buffers which pertain to the same set of output ports a multiplexer multiplexes according to the readout order the stored payloads from the output buffers to the output ports.

In this switching arrangement the data packets are not only stored in an output buffer and afterwards routed to the designated output port, but the data packet is stored in an output buffer already assigned to the correct output port. Thereafter no routing is anymore necessary. The only action after having stored the data packets is to select which of the data packets may be allowed to be forwarded to its output port. This task is performed by the arbiter and the multiplexer. The storing of the data packets in the output buffers may be done in several different manners.

On one hand there may be arranged only one address management and output queue set for all output buffers belonging to the same input port. This facilitates the control and reduces the space required therefor.

On the other hand each output buffer can be assigned to an own set of output queues with a separate address space. The additional circuitry leads to an enlarged address space which increases the throughput capacity for burst traffic of data packets.

A bypass for leading the data packets directly from the input ports to the output ports can be arranged together with a mechanism that signals to the bypass that it can be used. This bypass decreases the complexity of handling data packets in low-traffic conditions.

BRIEF DESCRIPTION OF THE DRAWINGS

Examples of the invention are depicted in the drawings and described in detail below by way of example. It is shown in FIG. 1 an input-buffered switch arrangement with a set of output buffers per input port, FIG. 2 an input-buffered switch arrangement with a set of output buffers per input port and with a set of used output queues per output buffer, FIG. 3 an output buffer with output queues, arbiter, multiplexer and a bypass, FIG. 4 an input-buffered switch arrangement with the input ports and output ports being pairwise grouped in sets.

All the figures are for sake of clarity not shown in real dimensions, nor are the relations between the dimensions shown in a realistic scale.

DETAILED DESCRIPTION OF THE INVENTION

In the following, the various exemplary embodiments of the invention are described.

Figure 1:
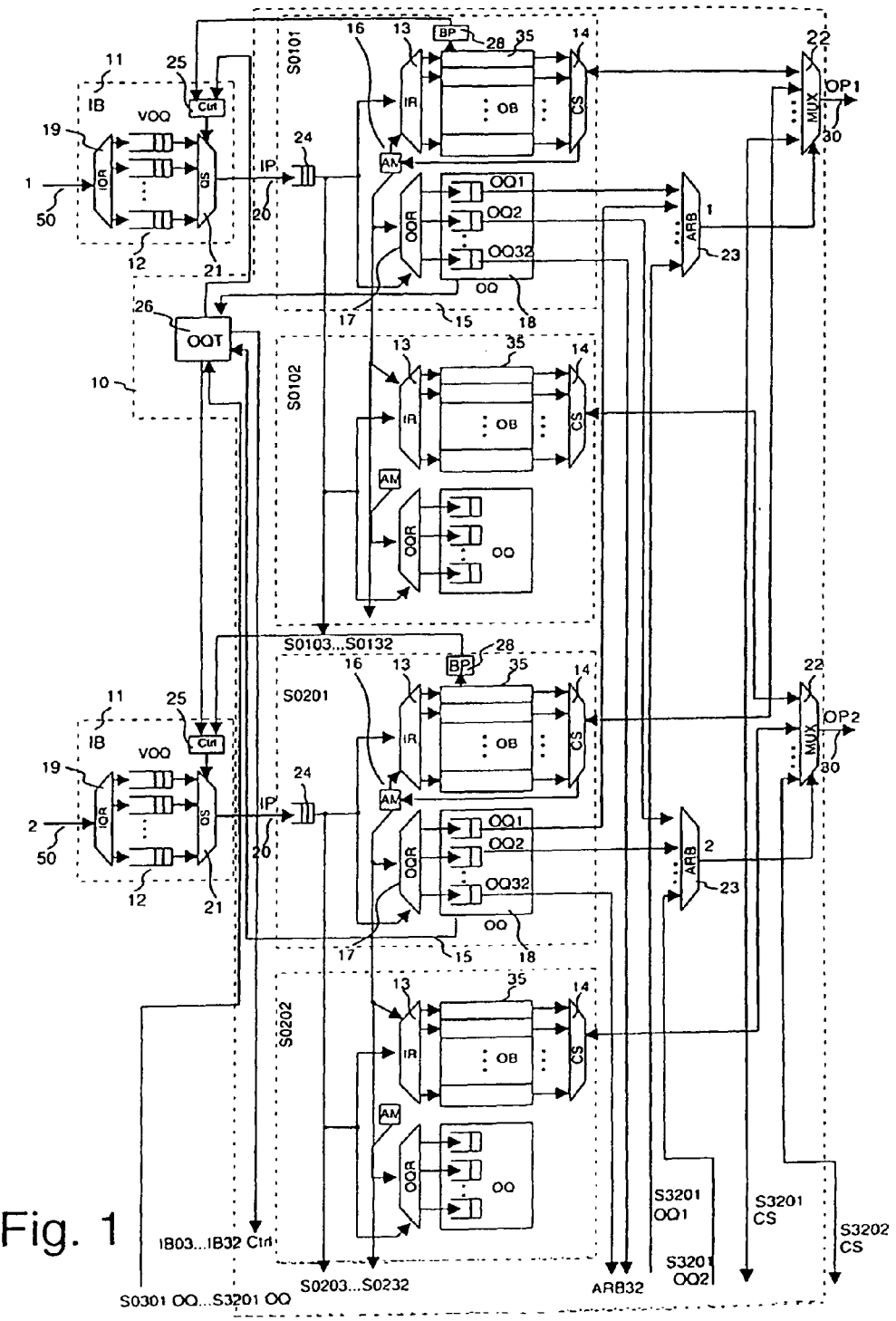

In FIG. 1 an input-buffered switching arrangement for handling data packets is shown. The arrangement comprises a switching device 10 with a number N of input ports 20 and a number N of output ports 30. The number N is here 32. At each input port 20, labeled with "IP", an input buffer 11, designated also with "IB", is arranged. Each input buffer 11 comprises an input controller 25, designated also with "Ctrl", which is itself connected to the switching device 10. The purpose is to lead the data packets, which arrive at the input buffers 11 via communication lines 50, and which are supposed to arrive at one or more of the output ports 30, to these output ports 30. From the output ports 30, the data packets can be delivered to subsequent devices, be it further switching devices or receiving devices, etc.

The data packets are here divided up into a packet header section and a packet payload section. In the packet header section, data packet destination information is contained, telling to which of the output ports 30 the respective data packet is to be delivered. Such data packet destination information may also be available from another source such that the data packet need not comprise the data packet destination information. There exist two types of data packets with respect to their data packet destination information: unicast data packets and multicast data packets. A unicast data packet is a data packet that has only one of the output ports 30 as destination. In contrast hereto, a multicast data packet is destined for more than one of the output ports 30. Hence, by definition, a multicast data packet is a data packet whose payload is destined for several output ports 30. In the packet payload section of a data packet any data that is to be delivered to a destination can be contained.

Input Buffer

The input buffers 11 are each split up into a multitude of input queues 12, whereby each input buffer 11 has exactly one such input queue 12 for each output port 30. So each input buffer 11 comprises here N input queues 12. Each of these input queues 12 in one input buffer 11 serves for storing therein the arriving data packets for one dedicated output port 30. So the arriving data packets are sorted in each input buffer 11 according to their destination output port 30. Hence, if a unicast data packet heading for a certain output port 30 is blocked due to this output port 30 being busy, the only data packets that are blocked by this head-of-the-line-blocking unicast data packet are data packets heading for the same output port 30, while data packets heading for another output port 30 can be handled independently and be forwarded to the switching device 10 when the path towards their destination output port 30 is unoccupied. This sorting per destination is also referred to as Virtual Output Queuing, short VOQ. The multitude of the input queues 12 together is also referred to as VOQ.

For distributing the data packets arriving at the corresponding communication line 50 into the correct input queues 12, the input buffer 11 comprises a demultiplexer 19, also called input queue router IQR. For selecting the data packets from the input queues 12 and delivering them via the corresponding input port 20 to the switching device the input buffer 11 comprises a queue selector 21, labeled with QS and serving as a multiplexer. The queue selector 21 selects one of the input queues 12 at any particular point in time and picks one data packet from that input queue 12, and sends it via its input port 20 to the switching device 10. The selecting process is controlled by the input controller 25 which gets its information therefore from the switching device 10. The input controller 25 at a certain point in time signals to the queue selector 21 whether it can send a data packet to the switching device 10 and if yes, from which input queue 12 that data packet can be sent to the switching device 10, respectively to one or more of its output ports 30. The order of fetching the queued data packets from the several input queues 12 is first of all determined by the accessibility of the output ports 30, i.e. their occupation state. When an output port 30 is idle, it is ready to receive a data packet and this is signaled to the input controller 25. The input controller 25 works as a queue arbiter by selecting which data packet from which input queue 12 at which time to send from the input buffer 11 to the switching device 10. One such input buffer 11 is arranged per input port 20.

Multicast data packets can be distributed at the demultiplexer 19 by making an entry into each input queue 12 whose corresponding output port 30 is denoted in the data packet destination header. This means that the multicast data packet is copied and entered itself into each such input queue 12. This also means that each multicast data packet heading for a number of n different output ports 30 is copied and queued such that in total n copies thereof reside in the input buffer 11 where the multicast data packet arrived. On the side of the queue selector 21 the principle of fetching only one data packet at a time can be altered in that for multicast data packets it is allowed to send several copies thereof to the switching device 10 at once. This reduces blocking effects to the multicast data packet. With other words, the disadvantage introduced by copying and distributing of a multicast data packet, which takes place at the demultiplexer 19, is countereffected by the advantage of merging several payload-equal packets into one forwarding process at the queue selector 21. Alternatively, such a multicast data packet can be stored only in one of the input queues 12 or in a separate multicast queue and be read out nondestructively from there to all its destination output ports 30.

Switching Section

The switching device 10 comprises for each input port 20 a separate switching section. Each such switching section comprises a set of output buffers 35 and for each of the output buffers 35 a separate input router 13 at their input side and a separate cell selector 14 at their output side. The input router 13 can here be a simple repowering tree or a demultiplexer. Each switching section comprises furthermore a set of output queues 18 with an output queue router 17 at their input side, and an address manager 16 providing input for all output queue routers 17 of the switching section. The set of output buffers 35 contains one output buffer 35 per output port 30. The set of output queues 18 contains one output queue 18 per output port 30. Each switching section hence contains N output buffers 35, N input routers 13, N cell selectors 14, N output queues 18, 1 output queue router 17 and 1 address manager 16. The output queue router 17 can also be a simple demultiplexer or repowering tree.

As indicated in FIG. 1, there may be even arranged such a set of output queues 18 for each output buffer 35, which sets however are then not used for this embodiment. Since in a manufacturing process it is often cheaper to manufacture certain components identically, which allows the use of a single process with identical masks and parameters, it may be preferred to manufacture each of the output buffers 35 with its own set of output queues 18, but in the final circuitry to not use those additional sets of output queues 18. So here only one set of output queues 18 is in fact used. The same applies to the address manager 16 and the output queue router 17.

Each of the input buffers 11 hence has its own set of input routers 13, designated also with "IR", to which via the corresponding input port 20 the input buffer 11 is connected. At the output side of each input router 13, the corresponding output buffer 35, designated also with "OB", is arranged, which serves as a intermediate memory for storing the data packets coming from the corresponding input router 13. The output side of the output buffer 35 leads to the corresponding cell selector 14, designated also with "OR". The output buffers 35 are equal in size and each comprise a predetermined number of memory locations, herein also referred to as cells. Each such memory location can contain a data packet and has a specific address.

In parallel to one of the input routers 13 and its corresponding output buffer 35, the output queue router 17 and the set of output queues 18 are arranged. The address manager 16, designated also with "AM", is arranged between the cell selector 14 of that output buffer 35 and its input router 13 as well as between that cell selector 14 and the output queue router 17. In the set of output queues 18 for each output port 30 such an output queue 18 is arranged, designated also with "OQ". Each output queue 18 receives input from the output queue router 17 and provides input to a different arbiter 23 whereby each such arbiter 23 is connected to a multiplexer 22, both being assigned to one of the output ports 30.

This arrangement is identical for all input ports 20. There are hence N arbiters 23 and N multiplexers 22, one of each per output port 30. The N output buffers 35 of each of the input ports 20 are assigned to the N output ports 30. This means that the data packets stored in a specific output buffer 35 are directed via its cell selector 14 always to the same output port 30. Since there is for each of the N input ports a set of N such output buffers 35, each output port 30 receives its data packets from N such output buffers 35.

All data packets arriving from one input port 20 are routed via its input routers 13 to its output buffers 35. The corresponding address manager 16 provides the input routers 13 of the same switching section with the information at which memory location in the output buffers 35, i.e. at which address therein, the arriving data packets are to be stored. Here, the address is used uniformly for all output buffers 35 that belong to the same set of output buffers 35. This means that the data packet is stored at the same address in all output buffers 35 belonging to this set. This in principle is a multiplication of the data packet because it is stored N times.

Address Management

The information, at which address in the output buffers 35 each data packet that is heading for a specific output port 30 is stored, is written via the corresponding output queue router 17 into the corresponding output queues 18. This information is referred to as order information. For each data packet that is stored in these output buffers 35 such order information is entered into the output queue 18 belonging to the output port 30 where this data packet shall be sent to. These addresses are thereby sorted according to the corresponding output ports 30, i.e. those output ports 30 to which the data packets stored at the respective addresses are heading. The sorting information, in which of the output queues 18 the respective address is to be put can be obtained from the input buffer 11 since the same queuing principle already has been used there, just for the whole data packet. The setting of the queue selector 21 can hence be used as setting for the output queue router 17.

The address management is centralized which means that a unicast data packet gets assigned only one address which is used then for all the output buffers 35 belonging to the input port 20, where the data packet arrived. Therefore only one address manager 16 is actually necessary for the whole set of output buffers 35 for one input port 20. The address manager 16 gets input from one of the cell selectors 14 of the same switching section which cell selector 14 signals to the address manager 16 when an address can be reused because the corresponding data packet has been processed and is no longer occupying the address. The address is then released and added to a pool of usable addresses that is managed by the address manager 16. From that pool the address manager 16 assigns addresses for subsequent data packets arriving.

For each output port 30 hence the stored addresses of the data packets, which shall arrive at that output port 30, can be retrieved from the respective output queue 18. The address manager 16 handles here simultaneously for each output queue 18 one address at each point in time. For the input port 20 an address is held available, and this can be done already before the respective data packets arrive. Each data packet arriving head-of-the-line at the input port 20, hence finds an address where to be lead by the corresponding input routers 13. This address is provided by the address-manager 16 also to the output queue router 17 which receives as further input the data packet destination information which provides the mask for into which output queue 18 to enter the order information for the arrived data packets. The case of non-availability of addresses is discussed further below.

Every incoming data packet at one input port 20 is hence given an address by the respective address manager 16, at which address this data packet is then stored in the corresponding output buffers 35, whereby the address is stored at a place in the output queue 18 corresponding to the output port 30, the data packet is heading for. The information therefore, i.e. the data packet destination information, can be derived from the packet header.

The subsequent arbiter 23 together with the corresponding multiplexer 22 serves for the final distribution, in that the arbiter 23 for its output port 30 retrieves from the corresponding output queue 18 the next address and feeds it to the multiplexer 22 which then fetches the data packet at that address and leads it to its output port 30 that is the destination of that data packet.

Data Packet Storing and Readout

When a data packet arrives, the address manager 16 will provide a free address if one is available, and the data packet will be stored at that memory location in the output buffers 35; otherwise, the data packet will be dropped in its entirety.

In principle the data packet that is processed is written in all output buffers 35 of the same switching section. This is not necessary except for the case of a multicast data packet heading for all output ports. Hence it is possible to mask the writing into the output buffers 35. This mask is already present in form of the data packet destination information. It may for example be present in form of a bitmap comprising a bit per output port 30, which bit is set to 1 for any output port 30 that is given as a destination of the data packet. Using this bitmap as a mask for the input routers 13, only those of the input routers could be enabled whose corresponding bit in the bitmap mask is set. This does not save time but energy.

A unicast data packet is, although being stored in all output buffers 35 of the switching section of the input port 20 where the data packet arrived, in fact read out only from one of the output buffers 35, namely from the one that belongs to the output port 30 to which the data packet is directed.

The fetching step of the data packet from the output buffers 35 can be a non-destructive reading process. After the data packet has been read out of the output buffer 35, the respective address is released in that this address is fed back to the corresponding address manager 16, which can assign this address again to the input port 20 for handling the next arriving data packet. By reusing that address the corresponding memory location in the output buffers 35 is reused and the data packet residing therein before is simply overwritten.

For multicast data packets a counter, not depicted in the drawing, can be used. Such a counter is then provided for every address, i.e there are as many counters as one output buffer 35 has memory locations. Upon storing the data packet at a specific address, the corresponding counter is set to the number of output ports 30 to which this data packet is to be transmitted. The counter is set to the number of destinations requested by the data packet's header. The address is appended to each output queue 18 to whose output port 30 the data packet is destined. When an address is selected by the cell selector 14 for data packet readout, the corresponding data packet is transmitted from the output buffer 35. The corresponding counter is decreased each time this data packet is fetched by one of the cell selectors 14. When the counter reaches the reading 0 for this data packet, indicating that the data packet has been delivered to all its destinations, the address thereof is returned to the free pool which means that the corresponding address can be released for being reused.

The principle of sharing the output buffer 35 is insofar introduced whereby the output queues 18 in total may have more queuing places than the output buffer 35 has addresses. By this measure, an asymmetry in the distribution of data packets concerning their destination can be buffered. In a totally fair and symmetric environment each input queue 12 would only be allowed to use 1/N of the output buffer space. However in reality one such input queue 12 may at any point in time receive more data packets than this fair share while other input queues 12 in the same input buffer may receive less than their fair share. By sharing the output buffer space, such asymmetry can be balanced and the output buffer space is better used. As long as the total traffic of the data packets per input port 20 does not exceed the real maximum capacity of the output buffer 35, the performance will increase, since the arrangement is much more flexible concerning extreme traffic pattern change. Particularly bursty traffic can be handled better, since the probability of data packet loss is reduced by allowing an input queue 12 to use more output buffer space than its fair share thereof would offer.

Since each input port 20 has its own set of output queues 18, there are in total N output queues 18 for each output port 30. All these output queues 18 that store the addresses for the data packets heading for the same output port 30 are led as input to the arbiter 23 for that output port 30. This arbiter 23 arbitrates for its output port 30 between the several output queues 18, i.e. it decides at which point in time which output queue 18 is queried for the next address by the corresponding multiplexer 22. This arbitration can be made subject to an arbitration policy like round robin, or preferring the fullest output queue 18 or the last non-accessed output queue 18 or any other suitable policy. Once having decided for a specific output queue 18, the arbiter 23 fetches therefrom the first address waiting in this output queue 18 and delivers it to the corresponding multiplexer 22 which is at its input side connected to all cell selectors 14 that belong to the corresponding output port 30, i.e. to all cell selectors 14 whose output buffer 35 is assigned to this output port 30. The arbiter 23 which has decided for a specific output queue 18 and has fetched the address from that output queue 18 informs the multiplexer 22 belonging to the same input port 20, in which of the output buffers 35 the data packet is stored at the fetched address. The corresponding multiplexer 22 is switched to access via the corresponding cell selector 14 that output buffer 35 and reads the data packet from that output buffer 35 and delivers it to the corresponding output port 30. Therefore the cell selector 14 receives from the multiplexer 22 the respective address and selects the corresponding cell. Alternatively this address can also be received directly from the arbiter 23.

Since for each output port 30 the data packet is copied and stored in a memory location of a separate output buffer 35, there is no need for an output router that connects several output ports to one or more output buffers 35. Therefore an increased memory space is used, but the output router can be renounced. Since memory space is much cheaper than space for a router logic, this design reduces the overall cost of the switching device 10. Furthermore the throughput speed is increased because an output router would be slower than a copying and storing process. Also the readout process is faster since for each output buffer 35 an own read pointer can be used.

The input routers 13, the cell selectors 14, and the multiplexers 22 provide here for each input port 20 the possibility to reach each output port 30 in a non-blocking way. Hence, at any point in time each input port 20 can send a data packet to any of the output ports 30, if such a data packet is arriving.

Input Buffer Design Variant

Each input port 20 has its input buffer 11 with virtual output queuing, i.e. with the input queues 12 for each output queue 18 in each input buffer 11. The input buffers 11 are connected to their own input routers 13. Each input buffer 11 has also its own input controller 25 for controlling the order of outgoing data packets from the different input queues 12 of that input buffer 11. Each input controller 25 works independently from the other input controllers 25.

The independence of the input controllers 25 reduces significantly the complexity of the overall controlling resources. Each input controller 25 here need only handle the arriving data packets according to a predetermined decision policy which might be a round robin policy, a round robin policy with fairness and priority-level precedence or any other policy. Each of the input controllers 25 individually decides which of the data packets it has stored will be sent to the input routers 13 next.

In a different arrangement with a common output buffer, among the several input controllers 25 a policy would have to be applied which distributes between them the right to send the queued data packets to the input ports 20. In the here described arrangement however, each input buffer 11 has its own set of input routers 13 which acts independently from the other sets of input routers 13 and it has its own output buffers 35 which are independent from the other output buffers 35. Hence, due to the splitting up of the output buffers 35 and the input routers 13, each input buffer 11 can forward its data packets to the output buffers 35 independently from the other input buffers 11. The only dependency between the different input buffers 35 concerns the backpressure mechanism as described further below.

The input buffer 11 with virtual output queuing can here also be realized using an additional common input buffer, not depicted here, with or without sharing. This means that the arriving data packets can be stored in the common input buffer while their addresses therein are stored in the input queues 12, ordered according to the output ports 30 where these data packets are heading. The addresses hence represent the entries for the data packets that are entered into the input queues 12. For multicast data packets only one entry in the common input buffer need be made, whereby in every input queue 12 which corresponds to an output port 30 the multicast data packet is heading for an entry is made. This entry in the input queues 12 is a pointer to the location where the multicast data packet or its payload is stored in the common input buffer. These entries are hence identical for multicast data packets and since the payload need only be stored once, memory space is saved. For implementing the common buffering of the payloads, the same elements, here not depicted, as used for the output buffer 35 may be used, i.e. an address manager and an input router for delivering the payloads to the common input buffer. The demultiplexer 19 plays a somehow similar role for the input queues 12 as does the output queue router 17 for the output queues 18.

The input buffers 11 can more easily be physically separated from the switching device 10 due to the smaller number of connection lines between the input buffers 11 and the switching device 10. The input buffers 11 can hence be realized with cheaper memory chips, and hence their buffer size can in reality be chosen much larger than the output buffers 35 at the same price. Hence with this scheme, the finite input buffers 11 represent a better approximation to the theoretical infinite input buffers 11.

The input buffers 11 can more easily be physically separated from the switching device 10 due to the smaller number of connection lines between the input buffers 11 and the switching device 10. The input buffers 11 can hence be realized with cheaper memory chips, and hence their buffer size can in reality be chosen much larger than its could be for the output buffers 35 at the same price. Hence with this scheme, the finite input buffers 11 represent a better approximation to the theoretical infinite input buffers 11.

Backpressure

A feedback mechanism is arranged which serves for signaling to the input buffers 11, if the total of the output queues 18 of one specific output port 30 is full, i.e. a certain threshold value for the filling degree of all output queues 18 for this output port 30 has been exceeded. Therefore an output queue threshold comparator 26, also designated with OQT, is arranged which collects all filling degrees of those output queues 18 which belong to one single output port 30 which is the same set of output queues 18 that is led to the arbiter 23 of that output port 30. The cumulated filling degree is the correct measure for the number of all data packets in the switching arrangement that are directed towards a specific output port 30. This cumulated number is hence to be measured against one or more predetermined thresholds and is done in the output queue threshold comparator 26. In the case the threshold is exceeded for one of the output ports 30, the above mentioned signal is generated and forwarded to the input controllers 25.

Upon this signal, each input controller 25 can react in that data packets heading for this output port 30 are no longer sent from the input buffers 11, i.e. the data packets from the input queues 12 for the occupied output queue 18 are held back, while the other input queues 12 can continue sending data packets.

Such an OQT 26 is arranged for every output port 30 and as depicted here may be unified in a single OQT 26, but can also be arranged separately per output port 30.

The backpressure scheme can as well be substituted by its negative equivalent, i.e. signaling whether an output queue 18 is still able to receive further entries, also referred to as grant scheme.

A further improvement can be achieved by feeding back to the input controllers 25 a signal that gives the input controllers 25 more detailed information about the filling degree of the total of the output queues 18 for each of the output ports 30. Since it is desired to have at any moment in time at any output port 30 a data packet to deliver to a subsequent stage, the information that a total of output queues 18 belonging to one common output port 30, in the following referred to as port set of output queues 18, is empty or almost empty can be fed to the input controllers 25 and be used to preferably send to the input routers 13 those data packets which head for the respective output port 30. The status information of the output queues 18 can e.g. be derived by introducing one or several additional threshold values, e.g. a threshold value at a filling degree 0 or close to 0. An empty or almost empty set of output queues 18 will hence be reported to the input controllers 25, which should then adopt his policy in a way, that an output queue 18 of this port set receives a data packet as soon as possible. Introducing several such threshold values allows a fine-grained status report to the input controllers 25 which can use this status report for each of the port sets of output queues 18 to influence their data packet multiplexing policy accordingly. This status report hence functions as sort of opposite of the backpressure, i.e. as low-load alarm or load-maximizing scheduling feedback signal.

The backpressure signal can here be propagated selectively to the input buffers 11, namely the backpressure signal originating in the output queues 18 for one specific output port 30 is only guided to the corresponding input queues 12 in the input buffers 11. Hence, all other input queues 12 are not blocked by this backpressure and can continue sending their data packets to the output buffers 35.

Since in the case of sharing, the sum of the number of places of all output queues 18 in one switching section is bigger than the number of addresses in the output buffer 35, the output buffer 35 can be filled up although no output queue 18 is reaching its threshold value for the therein stored data packets. Hence, the output buffer 35 also has a threshold value for occupied addresses, which when reached effects the creation of a memory-full-backpressure signal, to the input buffer 11 which in that case, has to stop sending its data packets to the output buffers 35 via the input routers 13. As soon as the number of occupied addresses falls below the threshold value, normal operation can be resumed. Such a mechanism that creates backpressure whenever that output buffer 35 runs out of space is provided for each output buffer 35. Since here all output buffers 35 which belong to the same input port 20 at any point in time contain the same information, the output buffer backpressure generator 28 is however arranged only once for each input port 20. To achieve a correct handling of the data packets, hence a flow-control mechanism for the data packets is added also for the output buffer 35, performed for each input port 20 by a corresponding output buffer backpressure generator 28 which creates a backpressure signal outgoing from one of the corresponding output buffers 35 to its input controller 25, which backpressure signal signals to the input buffer 11 that the output buffer 35 is, respectively output buffers 35 are, no longer able to buffer arriving data packets and hence the input buffer 11 is prevented from sending further data packets to the output buffer 35, until the backpressure induced by the backpressure signal has disappeared. The backpressure signal is created when the amount of data packets buffered in the output buffer 35 exceeds a predetermined threshold. This threshold is set lower than the actual size of the output buffer 35 in order to be able to buffer those data packets that may be sent during the time which the backpressure signal needs to effect the backpressure in the input buffer 11.

This arrangement allows for all input buffers 11 to send their data packets independently via their input routers 13, whenever the output queue 18 for this data packet and the output buffers 35 still hold enough space therefore, i.e. no backpressure signal has been generated.

For each switching section there is arranged here a switch input queue 24 which serves for buffering data packets in case of backpressure. Thereby data packets arriving from the input buffer 11 at the switching sections can be buffered as a single copy instead of being stored several times in the different output buffers 35.

Scale

In FIG. 1, for the sake of clarity not all elements of the switching device are depicted but indicated by dotted lines and references. The switching sections are marked in FIG. 1 with dashed lines and are numbered. For the first input port 20 the switching sections are indexed from S0101 to S0132, because N is here 32. For the second input port 20 the switching sections range from S0201 to S0232. For the last input port 20 the switching sections index runs from S3201 to S3232. There are hence a number of N*N switching sections in total.

Each address manager 16 feeds its address to the input routers 13 of all switching sections belonging to the same input port 20, e.g. for the first input port 20 to the input routers 13 of the switching sections S0101, S0102 . . . to S0132. The OQT 26 receives its input from the output queues 18 of all switching sections, i.e. S0101 OQ, S0201 OQ . . . to S3201 OQ, since here the output queues 18 for each input port 20 are arranged in the respective first switching section Sxx01. The output queues 18 are connected to the respective arbiter 23 of their corresponding output port 30, e.g. the 32nd output queue 18, labeled with OQ32, of each set of output queues 18 is led to the 32nd arbiter 23, i.e. ARB32, belonging to the 32nd output port 30, OP 32. The 2nd output queue 18, labeled with OQ2, of each set of output queues 18 is led to the 2nd arbiter 23, i.e. ARB2, belonging to the 2nd output port 30, labeled OP2. The numbers in FIG. 1 near to the arbiters 23 and communication lines 50 denote their number in the range 1 to N. The cell selectors 14 of all switching sections are connected according to their number to the respective multiplexer 22, e.g. the first cell selectors 14, also labeled CS, which are located in the switching sections S0101, S0201 . . . to S3201, are connected to the first multiplexer 22 at the first output port 30, labeled OP1.

Second Embodiment

Figure 2:
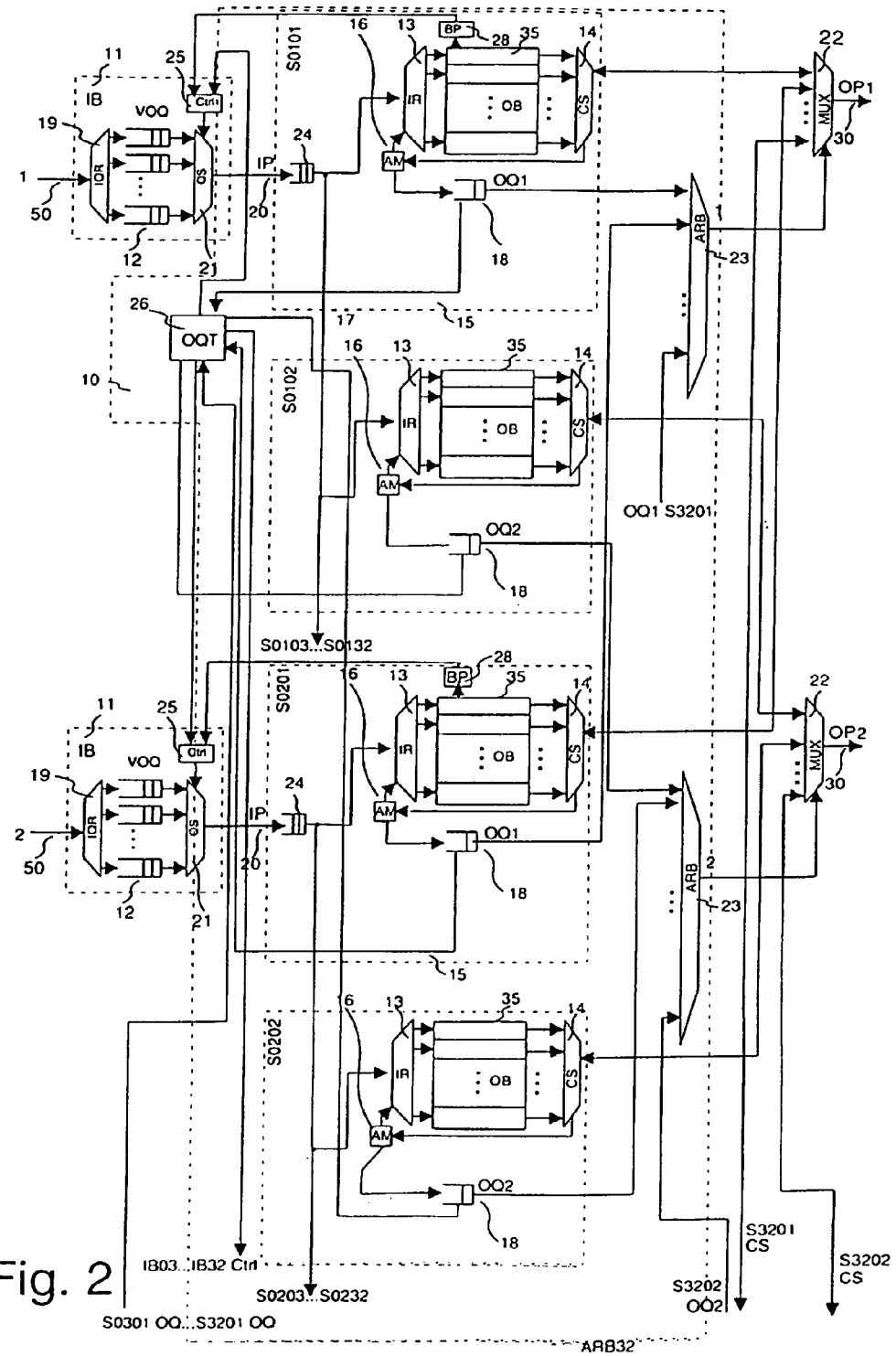

In FIG. 2, a second embodiment is depicted. It differs from the embodiment in FIG. 1 in the following respects.

Each switching section here has its own set of output queues 18 together with a corresponding output queue router 17 and an address manager 16. Thereby each output buffer 35 is independently manageable in its address space. The address management works thereby as explained above, but each copy of the data packet that is being stored in one of the output buffers 35 of the same input port 20, receives its own address. This has the advantage that for cases of inhomogeneous destination distribution a better throughput and output buffer usage can be achieved. A typical example of such an inhomogeneity would be a burst, i.e. a series of data packets with the same destination. In the case of such a burst, the situation could occur that the first output buffer 35 assigned to the first output port 30 is occupied exclusively by data packets that head for this first output port 30. In the case of a single address space as described in the first embodiment, at the same input port 20 the output buffers 35 for the other N-1 output ports 30 would be also filled with these data packets or at least not be usable since the addresses are already used up, without these other output ports 30 in fact being destinations of these data packets. With the enlarged address space here however, the other output ports 30 could be still served with data packets destined there.

For each output buffer 35 only one output queue 18 is present, whereby no output queue router 17 is necessary. In this embodiment the arbiter 23 also receives its input from all sets of output queues 18, collecting the output of those output queues 18 that queue the data packets heading for one and the same output port 30. The first arbiter ARB1 hence collects the output of all first output queues OQ1. This makes a total of N inputs for each arbiter 23.

Bypassing

Figure 3:
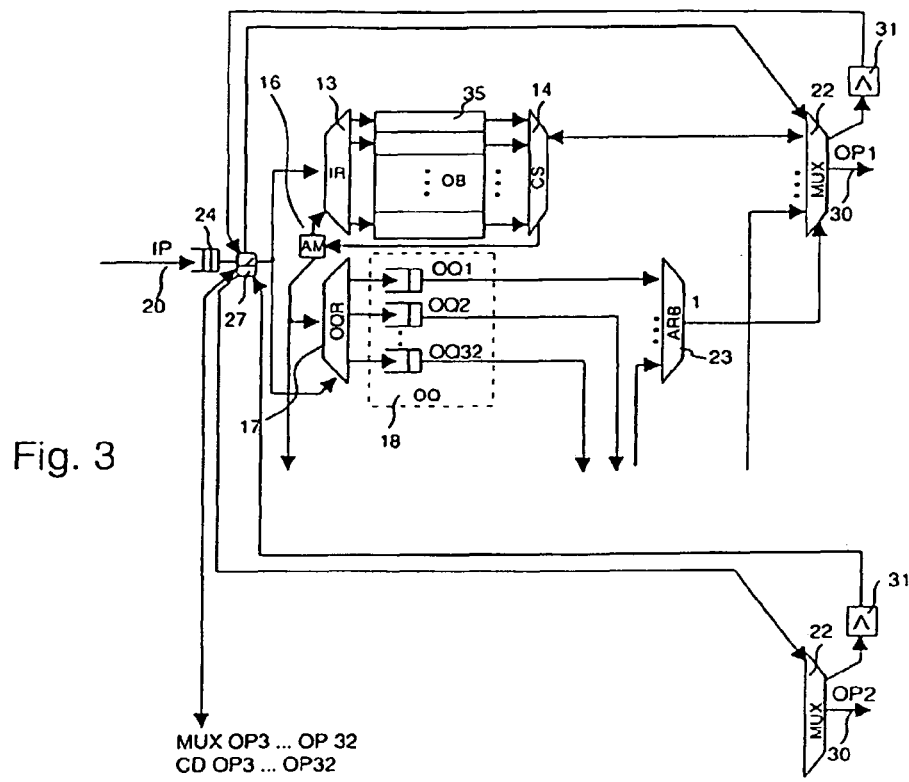

In FIG. 3 a detail of the switching arrangement is depicted wherein a bypass 27 is arranged. The bypass 27 is a switch arranged at the input port 20 after switch input queue 24. This bypass allows switching the path of a data packet arriving from the original path towards the input router 13 to a shortcut path towards the corresponding multiplexer 22. The bypass 27 is controlled by a congestion detector 31 which receives input from the multiplexer 22. The multiplexer signals to the congestion detector 31 whether it is ready to receive a data packet. This is typically the case when the corresponding arbiter 23 itself signals to the multiplexer 22 that it is ready to receive an address from the output queue 18 of the corresponding input port 20. In that case instead of performing the procedure of queuing an address in the output queue 18 and storing the data packet at that address in the output buffer 35 and reading that data packet out from there via the arbiter 23 and the multiplexer 22, the bypass 27 is set to directly lead the data packet to the multiplexer 22. This constitutes a quicker processing of that data packet which decreases the latency and reduces the risk of backpressure. Such a bypass 27 can be arranged for every switching section.

Third Embodiment

Figure 4:
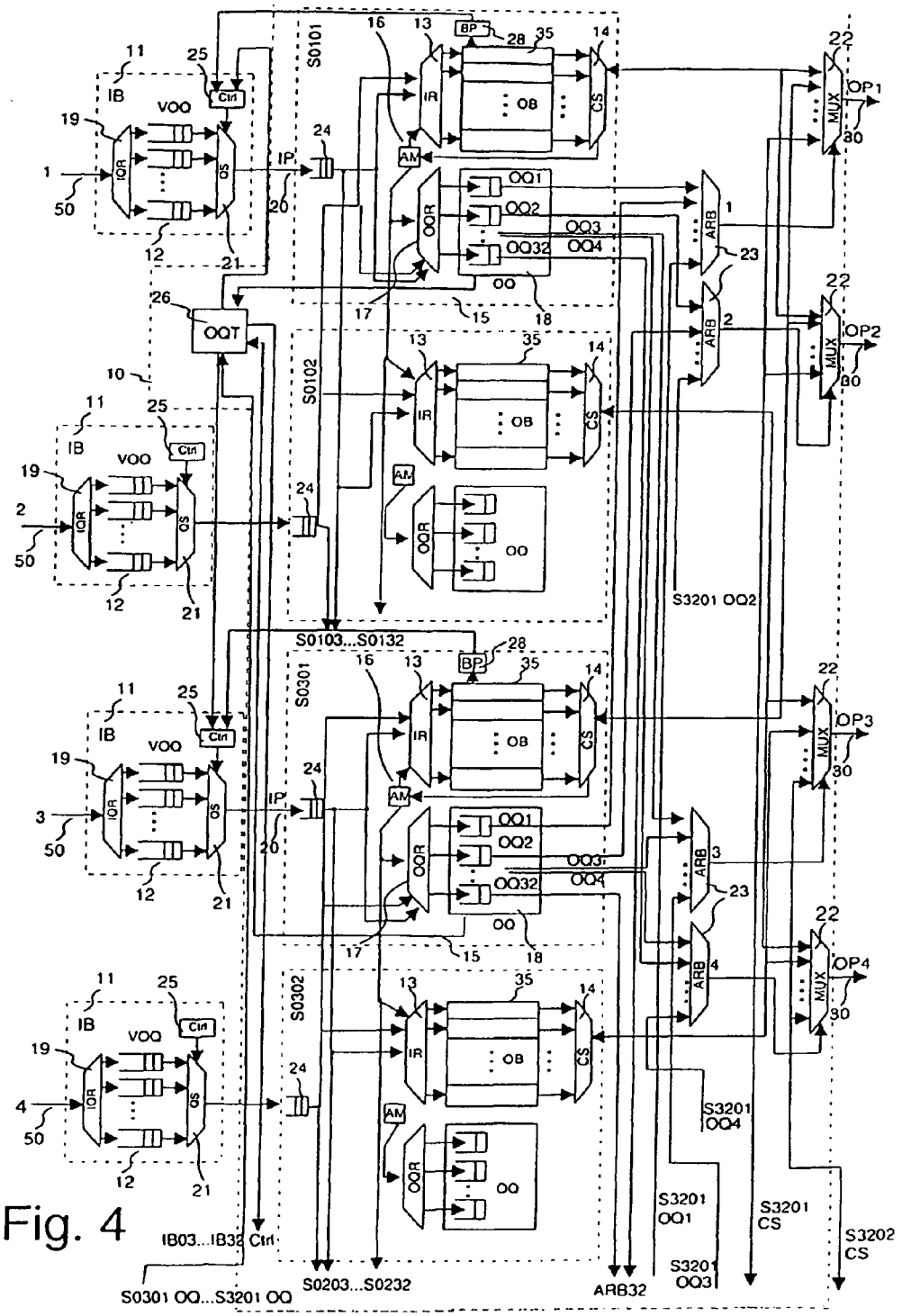

In FIG. 4 another embodiment of the invention is depicted. Herein a pairing of inputs and outputs has been utilized. The first input port 20, labeled with a "1", and the second input port 20, labeled with a "2" are both assigned to a common switching section. This means that the input routers 13 and the output queue router 17 of that switching section receive input from both these input ports 20. The input routers 13 therefore are designed as repowering trees with two inputs. The corresponding address manager 16 handles two addresses at each point in time, one for each input port 20. At the output side of the switching section, the cell selectors 14 are designed to deliver their output to each of the multiplexers of the first output port OP1 and the second output port OP2.

The second output buffer 35 of that switching section is hence via its cell selector 14 connected to the third output port OP3 and the fourth output port OP4. The rest of the output buffers 35 of that switching section is designed accordingly. The arbiters 23 for the corresponding set of output queues 18 are connected to the multiplexer 22 of the first output port OP1, respectively the multiplexer 22 of the second output port OP2. Each output port 30 hence has its own arbiter 23, collecting the output of the output queues 18 corresponding to that output port 30 and giving input to the corresponding multiplexer 22. This grouping of ports 20, 30 leads to the advantage of less space waste to the expense of some more logic that is necessary to handle the grouped ports at the same switching section. By this measure, an optimum between circuit complexity, incurring wiring complexity, design costs and possible latency effects, and multiplication of resources, namely mainly memory space, can be found.

Whereas this embodiment has been described with a combination of two input ports 20, respectively two output ports 30 sharing one switching section, any number of input ports 20/output ports 30 can be grouped together, using the same principle. It is thereby hence possible to design the switching device, assuming it has a number n of 32 input ports 20, such that it has 4 switching sections with eight input ports 20 each, or 8 switching sections with four input ports 20 each. Also inhomogeneous grouping can be used if desired.

In this embodiment the input ports are pairwise grouped and hence for sets of input ports 20 that comprise two of the input ports 20 each. Hence there are in this embodiment with n=32, 16 sets of input ports 20. The same applies to the output ports 30 which are also grouped pairwise and hence are divided up into 16 sets of output ports 30. For set of input ports 20 there is hence a set of output buffers 35, whereby this set of output buffers 35 comprises for each set of output ports 30 one output buffer 35. In these output buffers 35 at least the payload of each data packet arriving at the input ports 20 that belong to the corresponding set of input ports 20 is stored, namely at an address in at least those of the output buffers 35 to whose output ports 30 the data packet is heading. These output buffers pertain to the set of output buffers 35 that belongs to the mentioned set of input ports 20.

In the above described other embodiments the sets of input ports 20 have the minimum size, namely comprising only one input port 20. The same applies there for the sets of output ports 30, each comprising only one such output port 30.

Expandability

The herein presented switching arrangement is scalable with any of the known expansion methods, e.g. known from the PRIZMA architecture mentioned in the section describing background art. Hence speed expansion, port expansion, performance expansion, memory expansion, which here would be availability of bigger output buffer space, link-paralleling and also master-slave principle, and finally any combination thereof, are applicable.

The switching arrangement can of course also be modified such that its number of input ports 20 and output ports 30 is increased. The number of input ports 20 and output ports 30 need not be identical.

The performance of the switching arrangement can be increased in various ways.

Port Expansion

For the increase of the number of input- and output ports, the switching arrangement can be arranged in a multistage or in a single-stage arrangement. In the multistage arrangement, the number of needed switching arrangements grows slower than in a comparable single-stage arrangement, i.e. with a growing number of ports a multistage arrangement needs fewer switching arrangements than a single-stage arrangement.

However, the performance of a multistage arrangement is lower because of increased latency and because of the possibility of backpressure due to total use of an output queue by one connection which prevents processing of data packets with other destinations or a total use of the packet memory which blocks all switching arrangement input ports and propagates towards the preceding stage. This lower performance can to a certain extent be compensated by a speedup factor. This means that the switching arrangement is running at a higher speed than its environment. Then, an output buffer is arranged behind the switching arrangement to queue the faster incoming data packets which are sent out from the last stage and are to be passed over to the following hardware environment at a lower speed.

Memory Expansion

Another possibility is to increase the switch-internal memory, i.e. the output buffer space, such that total use is less likely. Such bigger memory is however extremely expensive and to some extent also physically limited. Increasing the switch memory by the memory expansion mode avoids the physical limit but is nevertheless expensive. If in a multistage arrangement a subsequent switching arrangement is crowded (output memory is full, i.e. no address available, or output queue is full), a backpressure signal can be generated for all input ports 20, which backpressure signal is again transferred to all preceding switching arrangements. In the case of full output queues 18, the backpressure can be selectively blocking only data packets heading for the full output queue 18. In the case of a full output buffer 35, all input ports 20 are to be blocked. The backpressure signal blocks the preceding switching arrangement in that this switching arrangement can no longer send cells.

The described mechanism is also applicable in other areas where a number of data generators, analogous to the input ports described herein, generate data to be routed to a number of data consumers, analogous to the output ports described, in an environment where wiring complexity and storage management complexity are more critical resources than storage volume. As an example, a computer processor or multiprocessor system may contain a number of processing units which generate data packets which are buffered and stored temporarily, until they can be used by other processing units. In such an environment, the processing units generating data correspond to the input ports, the processing units which consume the data correspond to the output ports, and the registers holding the data between the time it is generated and the time it is consumed correspond to the output buffers.

The described embodiments are combinable in part or in a whole.

The invention claimed is:

1. A switching arrangement for data packets that comprise a payload, said data packets heading via one or more input ports of a switching device towards one or more dedicated output ports thereof, said switching device being able to route said arriving data packets according to data packet destination information to at least one dedicated of said output ports, said switching arrangement comprising:

at least one switching section for each input port, said switching section comprising a set of output buffers comprising an output buffer for each output port for storing a payload of each data packet arriving at said input ports at an address in one of said set of output buffers and a set of output queues comprising an output queue for each output port, for storing said address of each payload stored in an output buffer, wherein stored addresses are sorted according to data packet destination information;

for each output port, an arbiter for controlling a readout order of said stored addresses from output queues associated with the output port and for providing the readout order to a multiplexer for that output port; and for each output port, a multiplexer for receiving a readout order from the arbiter for said output port and for multiplexing the stored payloads from said output buffers to said output port according to the readout order.

2. The switching arrangement according to claim 1, further comprising a switch input queue at each input port for queuing data packets arriving at said input port.

3. The switching arrangement according to claim 1, further comprising an address manager for each set of output queues for managing the use of said addresses of said output buffers, and an output queue router for entering said addresses at which said data packets are stored in said output buffers, into said output queues.

4. The switching arrangement according to claim 1, further comprising a bypass for each output buffer for leading payload directly from said input port to the multiplexer of the corresponding output port.

5. The switching arrangement according to claim 4, further comprising a congestion detector for each said output buffer for allowing a data packet to be led via said corresponding bypass when the corresponding multiplexer is able to multiplex said data packet to its output port.

6. The switching arrangement according to claim 1, further comprising an input router for each said output buffer for entering said data packets into said output buffers at said address.

7. The switching arrangement according to claim 1, wherein the output queues provide in total more queuing places for addresses than the corresponding output buffer has addresses.

8. The switching arrangement according to claim 1, further comprising an input buffer at each input port, said input buffer having at least as many input queues as said switching arrangement has output ports, and wherein said input queues sort arriving data packets according to their dedicated at least one output port.

9. The switching arrangement according to claim 8, further comprising an input controller for each input port, for controlling an order of multiplexing said data packets from said input queues to said switching device.

10. The switching arrangement according to claim 8 further comprising an output-queue threshold comparator for signaling to the input buffers if a threshold value of occupied places in the total of all output queues pertaining to one common output port is exceeded.

11. The switching arrangement according to claim 10, wherein said input buffers are designed such that upon a signal from the output-queue threshold comparator that the threshold value of occupied places in the total of all output queues pertaining to the same output port is exceeded, only the input queue which corresponds to said same output port is prevented from delivering its data packets to said same output port.

12. The switching arrangement according to claim 8, wherein for each output buffer an output buffer backpressure generator is provided for signaling to the input buffer corresponding to said output buffer that a threshold value of occupied addresses in said output buffer is exceeded.

13. The switching arrangement according to claim 8, wherein, for a multicast data packet, the address is provided as an entry in each of the output queues for each destination output port and the address is released by the address manager for use for another data packet when all entries of said multicast data packet have been used for delivering said multicast data packet to designated output ports.

14. The switching arrangement according to claim 8, wherein for data packets with different handling-priorities, a separate input queue is provided for each class of priority and for each output port in each input buffer.

15. The switching arrangement according to claim 8, comprising a demultiplexer for creating an input queue entry for each of said arriving data packets based on packet destination information of the corresponding data packet, whereby each said input controller is designed to allow simultaneous transmission of those data packets having identical payload from different input queues.

16. The switching arrangement according to claim 15, wherein each said entry comprises at least the payload of the corresponding data packet or a pointer to a memory cell wherein at least the payload of the corresponding data packet is stored.

17. The switching arrangement according to claim 15, wherein when a data packet is a multicast data packet, the demultiplexer is designed to make several entries in said input queues and only one entry of the payload thereof in a memory cell.

18. The switching arrangement according to claim 16 wherein the memory cell is located in a common input buffer.

* * * * *